Dec. 22, 1970     H. LEIBER     3,549,212

ANTI-LOCKING CONTROL SYSTEM

Filed June 3, 1969     3 Sheets-Sheet 1

INVENTOR
Heinz Leiber

BY Spencer & Kaye
ATTORNEYS

United States Patent Office 3,549,212
Patented Dec. 22, 1970

3,549,212
ANTI-LOCKING CONTROL SYSTEM
Heinz Leiber, Leimen, Germany, assignor to Teldix GmbH, Heidelberg, Germany
Filed June 3, 1969, Ser. No. 829,862
Int. Cl. B60t 8/06
U.S. Cl. 303—21                                              7 Claims

ABSTRACT OF THE DISCLOSURE

An anti-locking control system for vehicle brakes includes control and auxiliary inlet valves disposed in parallel between the master cylinder and the wheel braking cylinder to allow the brake fluid pressure in the wheel cylinder to rise rapidly at the initiation of brake application. Thereafter, the auxiliary inlet valve is closed and held closed during the initiated brake application while the control inlet valve is actuated in conjunction with an outlet valve variably to control the fluid pressure in the wheel cylinder. In this way, the pressure rises of brake fluid in the control process when the auxiliary valve is closed and the control inlet valve is alternately opened and closed may be limited to rates most conducive to the desired control action without degrading the rapid rate of pressure rise achieved at the initiation of braking application.

BACKGROUND OF THE INVENTION

In anti-locking control systems for pressure-actuated vehicle brakes in which the wheel cylinder brake fluid pressure is controlled discreetly in accord with acceleration and deceleration values of the associated wheel as sensed by wheel-associated mechanism, it is desirable to control the rate of pressure rise as the control valve is actuated between closed and opened positions in order to achieve the most efficacious braking action.

On the other hand, it is desirable to allow the pressure to build up in the wheel cylinder at the initiation of brake application as rapidly as possible and which, under ordinary circumstances, will desirably be much more rapid than the pressure rises desired during the control cycles.

SUMMARY OF THE INVENTION

Accordingly, it is an object of the present invention to provide an anti-locking control system for pressure-actuated vehicle brakes wherein pressure rises at the wheel cylinder during the control process may be tailored to the desired value without degrading the capability for very rapid pressure rise at the initiation of brake application.

According to the present invention, the above objective is attained by utilizing a control inlet valve between the vehicle master cylinder and the wheel cylinder and, in parallel therewith, an auxiliary inlet valve so that the two inlet valves cumulatively provide sufficient flow area to allow very rapid pressure rise during initiation of brake application, whereafter the auxiliary inlet valve is closed, and held closed during the brake application while the control inlet valve is actuated between closed and opened positions, in conjunction with the outlet valve, to establish the requisite pressure rises during the control cycle.

The system according to the present invention includes a normally open inlet valve between the master cylinder and the wheel cylinder, a normally closed outlet valve for relieving the pressure in the wheel cylinder, and an auxiliary inlet valve in parallel with the first mentioned inlet valve. Sensing mechanism is associated with the vehicle wheel for sensing deceleration and acceleration thereof and subsequent to initiation of brake application, as soon as one predetermined value of wheel deceleration is sensed, the first mentioned inlet valve is closed and as soon as a second value of wheel deceleration is sensed, the auxiliary inlet valve is closed and the outlet valve is simultaneously opened. A pressure sensitive switch in the form of the vehicle brake light switch is provided which enables the sensing mechanism to perform the functions as aforesaid and the control circuit for the auxiliary inlet valve includes a holding relay whose holding circuit is in series with the brake light switch whereby, when once actuated, the auxiliary inlet valve is held closed during the particular brake application under consideration but as soon as the brake application is terminated, the brake light switch is opened immediately to reestablish the open condition of the auxiliary inlet valve.

The auxiliary inlet valve may be shared by two vehicle wheel braking cylinder systems in which case the two parallel branches formed by the common auxiliary inlet valve with the two control inlet valves are provided with check valves leading to the respective wheel cylinders.

DESCRIPTION OF THE PREFERRED EMBODIMENTS

Figure 1:
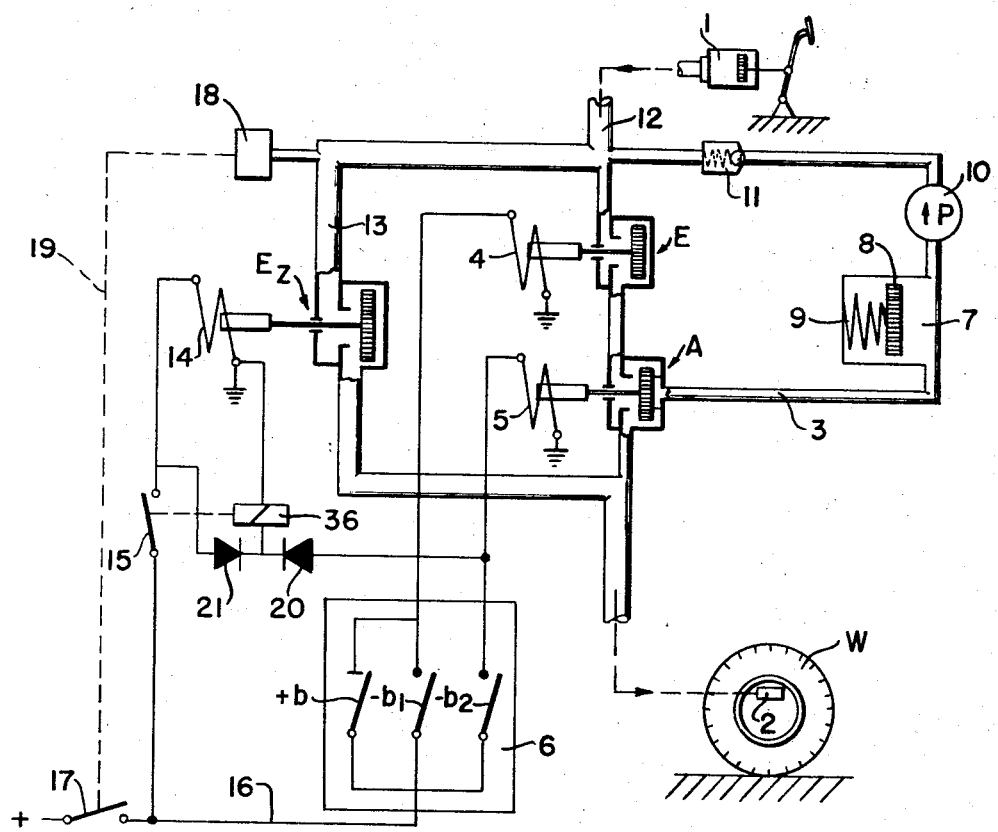
FIG. 1 is a schematic representation of the electrical and hydraulic portions of an anti-locking control device in association with a vehicle wheel.

As shown in FIG. 1, the anti-locking control system according to the present invention is associated with a vehicle brake system including the operator-controlled master cylinder 1 adapted to transfer brake fluid to the wheel cylinder 2 through the main conduit 12, the normally open inlet valve E, the outlet valve A and through a parallel channel 13 and the auxiliary inlet valve $E_z$ which also is normally open, substantially as is shown. The sensor means 6 is associated with the vehicle wheel W and includes a plurality of switches $+b$, $-b_1$ and $-b_2$ which, as will be seen, control the various valves E, A and $E_z$.

The inlet valve E is provided with an actuator 4 so as to be operated from its normally open position as shown to a closed position whereas the outlet valve A is provided with an actuator 5 whereby it may be moved from its normally closed position as shown to a position in which it allows fluid from the wheel cylinder 2 to be bled through the conduit 3 into the accumulator 7 and through the pump 10 and check valve 11 back to the master cylinder 1. The accumulator 7 may include a piston 8 and a relatively light spring 9.

The auxiliary inlet valve $E_z$ is also provided with an actuator 14. Further, the system includes a pressure sensitive switch 18 adapted to be closed in response to actuation of master cylinder 1 and, as shown, there is a mechanical connection at 19 between this actuator 18 and its switch contact 17 which conveniently may function as the vehicle brake light switch. When actuated, the switch 17 enables the sensor mechanism 6, as illustrated by the conductor 16, and it will be seen that whereas the sensor switch $-b_1$ is effective to close the inlet valve E, the contact $-b_2$ is effective, through diode 20, to complete the circuit through the holding relay 22 consequently to close the contact 15 thereof and actuate the auxiliary inlet valve $E_Z$ to its closed position. It will be appreciated that the relay 17 is a holding relay having a holding circuit including the diode 21 as shown. The sensor contact $+b$ is a wiping contact arrangement and will be seen to be effective first to retain the inlet valve closed and thereafter to permit it to open, as will be described hereinafter.

Figure 2:
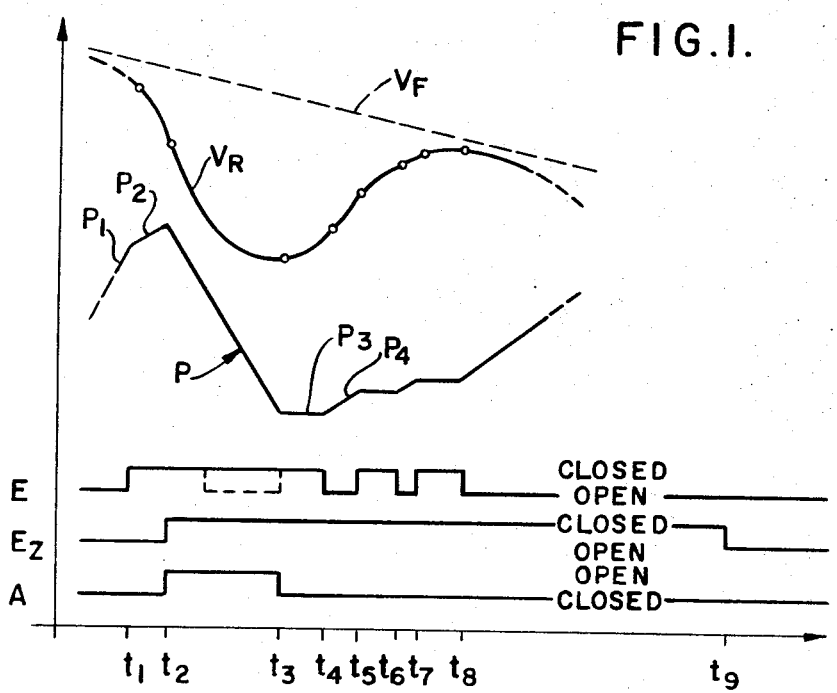
FIG. 2 shows a time diagram for the arrangement according to FIG. 1.

Since some predetermined quantity of brake fluid must be transferred from the master cylinder 1 to the wheel cylinder 2 before the brake elements commence to exert their braking force, it is important in conjunction with establishing a minimum response time of the brake system to provide a sufficiently large cross-sectional area for brake fluid flow between the master cylinder 1 and the wheel cylinder 2 at the initiation of brake application to permit the pressure rise to be of requisite rate. In the present system, this is accommodated for by virtue of the fact that the two valves E and $E_Z$ are in parallel and are open at the initiation of braking application. As soon as the relatively rapid pressure rise is achieved and the braking application commences, the wheel will decelerate and when the deceleration thereof reaches a predetermined value, the contact $-b_1$ of the sensor 6 will close thus actuating the inlet valve E to closed position as indicated at time $t_1$ in FIG. 2 and modifying the relatively rapid pressure rise indicated by the pressure curve portion $P_1$. Thereafter, the auxiliary inlet valve $E_Z$ will remain open which will slightly decrease the pressure rise as indicated by the portion $P_2$ of the pressure curve P and, at time $t_2$, the contact $-b_2$ closes which simultaneously opens the outlet valve A and closes the auxiliary inlet valve $E_Z$. The wheel cylinder pressure then decreases as indicated until the wheel accelerates causing closing of the switch $+b$ and opening of the contacts $-b_1$ and $-b_2$ thereby to retain the inlet valve E in closed condition but allowing the outlet valve A to return to its normally closed condition whereupon the pressure in the wheel cylinder will remain constant as indicated by the pressure curve portion $P_3$, it being appreciated that during the time interval $t_3$ to $t_4$ the $+b$ contact is closed and the $-b_1$ and $-b_2$ contacts are open. The wheel continues to accelerate and at time $t_4$ the contact $+b$ passes beyond its wiping contact and again opens allowing the inlet valve E to open whereby the pressure increases in the wheel cylinder as indicated by the portion $P_4$ of the pressure curve. Since the auxiliary inlet valve $E_Z$ is closed and held closed once the contact $-b_2$ is initially closed during a brake application, the rate of pressure rise in the portion $P_4$ and subsequent pressure rises during the cycle will be substantially less than the pressure rise in the portion $P_1$ of the pressure curve P. Thus, the pressure rises during the control cycle may be tailored to fit the requisite cyclic brake action. In FIG. 2, it will be appreciated that the curve $V_F$ indicates the vehicle speed during the braking action, $V_R$ illustrates the peripheral speed of the braked wheel and the lines E, $E_Z$ and A diagrammatically illustrate the open and closed positions of the respective valves as indicated by the legends. It will also be appreciated that the time interval $t_5$ to $t_6$ and $t_7$ to $t_8$ indicate positions in which the inlet valve E is closed upon attainment of wheel rotational accelerations causing closing of the contact $+b$ whereas the time intervals $t_4$ to $t_5$ and $t_6$ to $t_7$ illustrate positions at which such contact $+b$ is opened by wiping to the left side because of much higher accelerations. At time $t_8$, the $+b$ contact opens again to the position shown in FIG. 1 due to the disappearance of acceleration of the wheel and further cycles may follow.

In any event, the auxiliary inlet valve $E_Z$ remains closed until the stop light contact 17 opens again which is illustrated at time $t_9$ in FIG. 2 at which time, of course, the operator has ceased braking actuation and the full actuation of the brake system is thus instantly available for further braking if desired.

Figure 3:
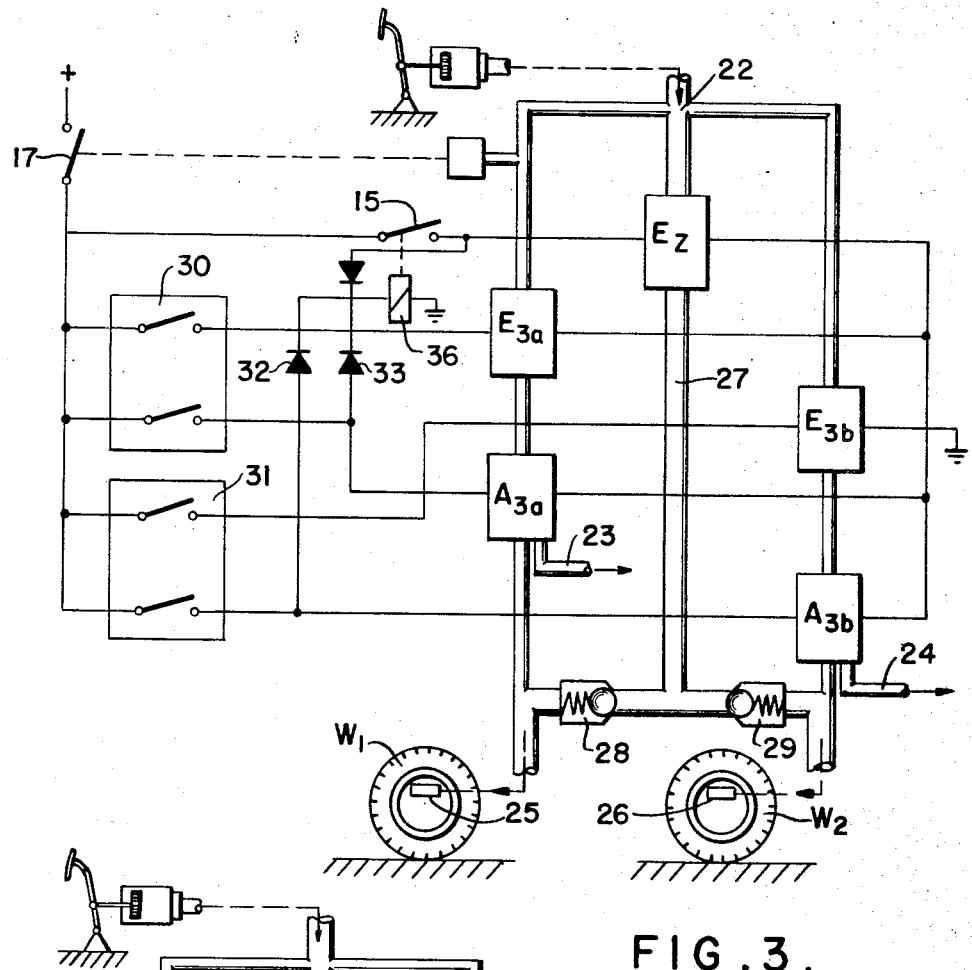
FIG. 3 shows a control system in conjunction with a pair of vehicle wheels with individual control of the wheel.

In the system shown in FIG. 3, two wheels $W_1$ and $W_2$ at opposite sides of the vehicle are shown with their respective wheel cylinders 25 and 26. The normal inlet channels for the respective wheels are through the normally open inlet valves $E_{3a}$ and $E_{3b}$ and through the respective outlet valves $A_{3a}$ and $A_{3b}$, the circuits for the return lines 23 and 24 being omitted for the sake of simplicity. The common main pressure conduit 22 contains the common auxiliary inlet valve $E_Z$ leading, through conduit 27 and respective branches containing the check valves 28 and 29 to the respective wheel cylinders 25 and 26. The respective wheel sensors are diagrammatically illustrated at 30 and 31 and it will be appreciated that once the stop light switch 17 has been closed, to thus enable the sensors 30 and 31, the upper contacts illustrated may close upon a predetermined degree of wheel deceleration to close the respective normally open inlet valves $E_{3a}$ and $E_{3b}$. Parallel paths are provided, through the respective diodes 32 and 33 when either of the lower, second deceleration threshold switches of the sensors 30 and 31 are closed, thus to energize the holding relay 22 to actuate and hold the common auxiliary inlet valve $E_Z$ closed. The check valves 28 and 29 allow the requisite pressure to be established in their respective wheel cylinders while preventing pressure equalization therebetween, thus rendering the two wheels individually controllable according to the conditions of the road surface upon which they are engaged.

Figure 4:
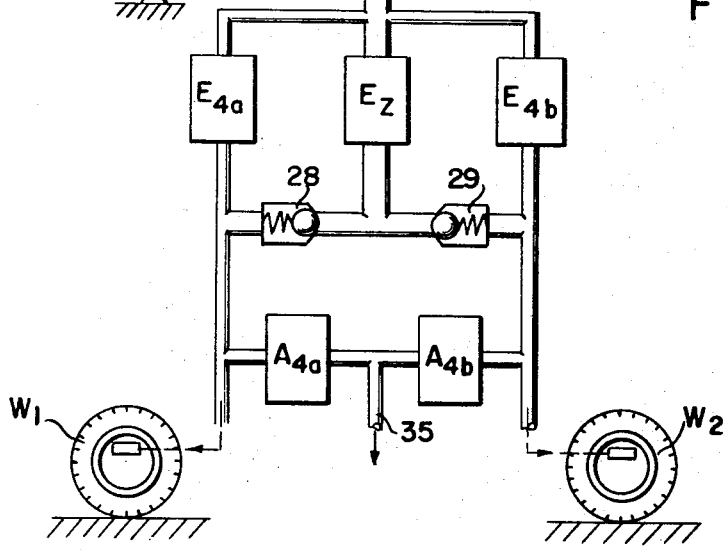
FIG. 4 is a schematic representation of the hydraulic portion of a modified system similar to that shown in FIG. 3.

The modification according to FIG. 4 illustrates the hydraulic system with the electrical system omitted since it is identical with that of FIG. 3. Whereas the valves $A_{3a}$ and $A_{3b}$ of FIG. 3 are three way valves, the valves $A_{3a}$ and $A_{4b}$ of FIG. 4 are two way valves and are not incorporated in the pressure lines to the wheel brake cylinders. As is shown, the outlet valves return fluid through the common return line 35 and the common auxiliary inlet valve $E_Z$ bridges the respective control inlet valves $E_{4a}$ and $E_{4b}$ through the check valves 28 and 29.

Figure 5:
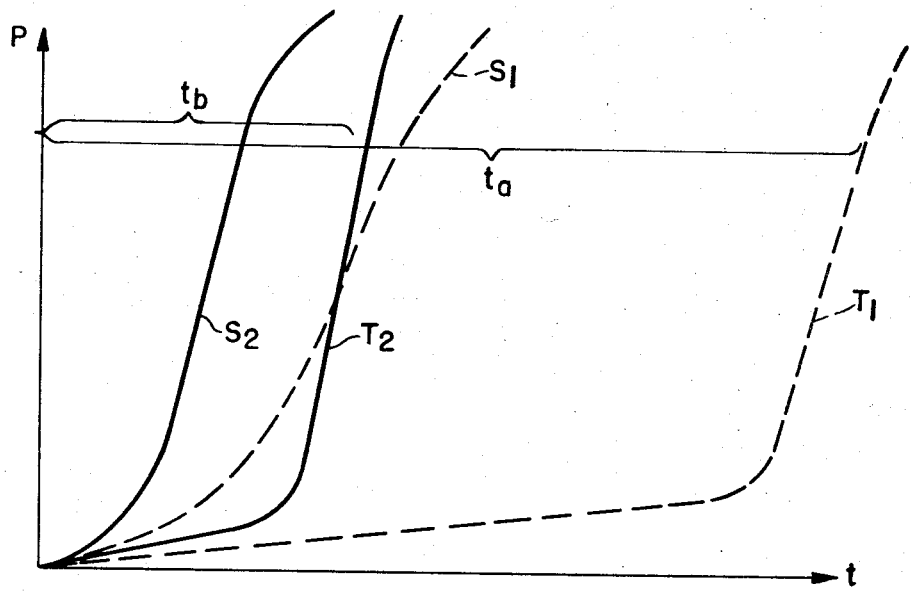
FIG. 5 shows the brake pressure buildup during initiation of brake application according to the present invention in comparison with that achieved by previous systems.

The diagram shown in FIG. 5 compares systems with and without the auxiliary inlet valve according to the present invention. The curves $T_1$ and $S_1$ represent respectively the pressure curves at the beginning of brake actuation for drum and disc brakes respectively in a system not employing the auxiliary inlet valve of this invention. Inasmuch as a greater amount of fluid must be displaced in order to initiate actuation of drum brakes as opposed to disc brakes, the response time for the drum brake curve $T_1$ is substantially greater than for the disc brake curve $S_1$ due to the restricted flow through the single inlet valve. The curves $T_2$ and $S_2$ shows the response times achieved according to the present invention with the additional common inlet valve auxiliary to the normal control valve and, as will be seen, the response times are substantially less in conjunction with the present invention. As an example, measurements on a truck having drum brakes has shown that it is possible to reduce the time $t_a$ from 700 msec. to $t_b=300$ msec., the pressure reached in each case being equal to 100 atmosphere gauge. According to this example, if it is assumed that the braking delay is approximately 0.8 g., it can be shown that with a full braking action from 30 km./h., the aforesaid reduction of 400 msec. reduces the braking distance from 9.7 m. to 7.2 m., i.e., by about 25%.

Figure 6:
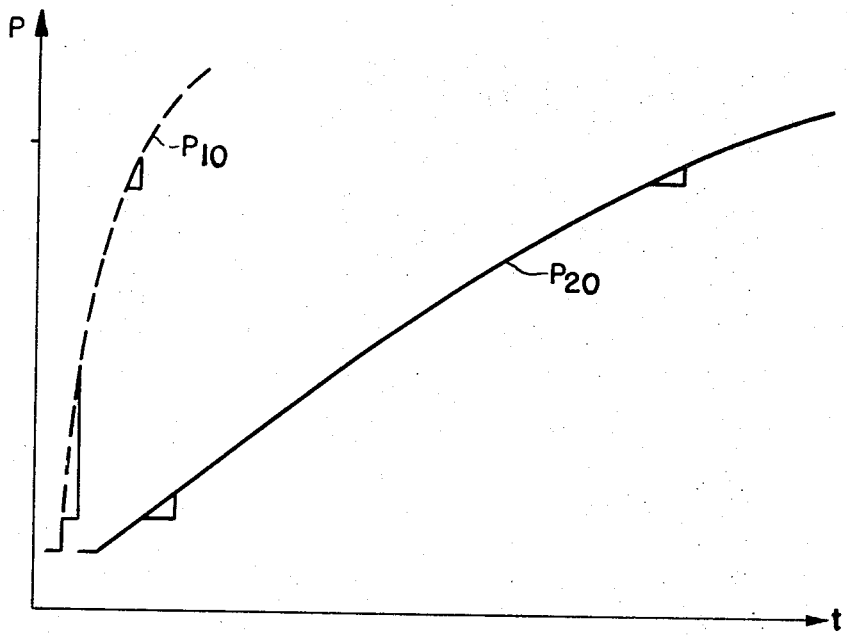
FIG. 6 shows the brake pressure buildup during a control cycle, the pressure in the main conduit being constant and substantially high.

FIG. 6 shows the brake pressure build-up during the control process, after attainment of the high pressure level in the main conduit and after the brake pressure has decreased at least once before that build-up. The dashed line curve $P_{10}$ illustrates the braking system without the auxiliary inlet valve whereas the solid line curve $P_{20}$ illustrates the system with the auxiliary inlet valve. It will be appreciated from FIG. 6 that the pressure rises within the system employing the auxiliary inlet valve is correspondingly slower due to the reduction in cross-sectional flow area occasioned by closing of the auxiliary inlet valve, thereby to provide a smoother and more easily controlled braking cycle. The curve $P_{10}$ shows the pressure build-up with the use of only a single inlet valve which was dimensioned according to a compromise in the interest of considerations made with respect to FIG. 5, that is to say, it could not be restricted further because the pressure build-up time would have become too great during the initiation of the braking action. Both curves start from a reduced brake pressure of about 60 atmospheres gauge, the pressure in the main conduit being approximately 140 atmospheres gauge. FIG. 6 of course illustrates the fact that the present invention allows the pressure rise along the curve $P_{20}$ to be tailored in any way desired inasmuch as the initial response time can be obtained by making the auxiliary inlet valve of as large cross section as is necessary to act cumulatively with the control inlet valve to achieve the requisite response time with the desired control pressure rise characteristic.

Additionally, it will be apparent that systems according to the present invention will not only allow faster response times and better pressure rise control during the control cycles, but will also introduce a safety factor in the event of system malfunction. That is to say, the redundancy in the fluid inlet side decreases the probability of a malfunction blocking the master cylinder from the wheel cylinder.

It will be understood that the above description of the present invention is susceptible to various modifications, changes and adaptations.

I claim:

1. In an anti-locking control system for vehicle brakes of the type having a wheel braking cylinder, an operator-controlled master cylinder for transmitting braking pressure to the wheel braking cylinder, a normally open inlet valve communicating said master cylinder with said wheel braking cylinder, pressure reducting means for selectively relieving the pressure at said wheel braking cylinder, and vehicle wheel acceleration-deceleration sensor means for actuating said normally open inlet valve and for actuating said pressure reducting means whereby to control braking pressure applied to said wheel braking cylinder during brake operation, the improvement comprising; in combination: a normally open auxiliary inlet valve in parallel with said normally open inlet valve to permit pressure transmission from said master cylinder to said wheel braking cylinder to occur rapidly at the initiation of brake application; and locking means including a switch responsive to operation of said master cylinder for actuating and holding said auxiliary inlet valve closed subsequent to said initiation of brake application.

2. The anti-locking control system as defined in claim 1, wherein said switch is the brake light switch for the vehicle.

3. The anti-locking control system as defined in claim 2 wherein said pressure reducing means is a normally open outlet valve.

4. The anti-locking control system as defined in claim 3 wherein said sensor means includes first and second switches actuated respectively in response to first and second rotational deceleration values of the vehicle wheel and a third switch actuated in response to rotational acceleration of the vehicle wheel, said first, second and third switches being in series with said switch responsive to operation of said master cylinder, said first switch being effective to close said inlet valve, said second switch being effective to close said auxiliary inlet valve and actuate said pressure reducing means, and said third switch being effective to close said inlet valve until a predetermined acceleration value of the vehicle wheel is present.

5. The anti-locking control system as defined in claim 1 wherein said sensor means simultaneously actuates said pressure reducting means and said auxiliary inlet valve.

6. The anti-locking control system as defined in claim 1 including a second wheel braking cylinder associated with a second vehicle wheel and having a normally open inlet valve communicating said master cylinder thereto, second pressure reducing means for selectively relieving the pressure at said second wheel braking cylinder, and second sensor means associated with the second vehicle wheel for actuating said second normally open inlet valve and for actuating said second pressure reducing means, said auxiliary inlet valve being in parallel with both said inlet valves, the parallel channels established by said auxiliary inlet valve both including a check valve leading to their respective wheel braking cylinders.

7. The anti-locking control system as defined in claim 6 wherein each of said sensor means includes a switch responsive to a predetermined value of associated wheel rotational deceleration to actuate its associated pressure reducing means and close said auxiliary inlet valve.

References Cited

UNITED STATES PATENTS

| 3,276,822 | 10/1966 | Lister et al. | 303—21 UX |
| 3,401,987 | 9/1968 | Horvath | 303—21 |
| 3,494,670 | 2/1970 | Leiber | 303—21 |
| 3,498,683 | 3/1970 | Leiber | 303—21 |

MILTON BUCHLER, Primary Examiner

J. J. McLAUGHLIN, JR., Assistant Examiner

U.S. Cl. X.R.

188—181; 303—63, 68